United States Patent
Margulis et al.

(10) Patent No.: US 9,838,488 B2
(45) Date of Patent: Dec. 5, 2017

(54) AGENT ASYNCHRONOUS TRANSACTION MONITOR

(71) Applicant: AppDynamics LLC, San Francisco, CA (US)

(72) Inventors: Michael Margulis, San Francisco, CA (US); Ryan Ericson, San Francisco, CA (US); Alexander Fedotyev, San Francisco, CA (US); Sanjay Nagaraj, San Francisco, CA (US)

(73) Assignee: AppDynamics LLC, San Francisco, CA (US)

( * ) Notice: Subject to any disclaimer, the term of this patent is extended or adjusted under 35 U.S.C. 154(b) by 3 days.

(21) Appl. No.: 14/701,414

(22) Filed: Apr. 30, 2015

(65) Prior Publication Data

US 2016/0323396 A1    Nov. 3, 2016

(51) Int. Cl.
*G06F 15/173* (2006.01)
*H04L 29/08* (2006.01)

(52) U.S. Cl.
CPC .................................. *H04L 67/22* (2013.01)

(58) Field of Classification Search
USPC .......................................... 709/224; 717/130
See application file for complete search history.

(56) References Cited

U.S. PATENT DOCUMENTS

| | | | | |
|---|---|---|---|---|
| 6,260,187 B1 * | 7/2001 | Cirne | ................... | G06F 9/4428 717/110 |
| 7,225,361 B2 * | 5/2007 | Cobb | ................. | G06F 11/3612 714/35 |
| 7,248,603 B1 * | 7/2007 | Grunkemeyer | ....... | G06F 9/4425 370/465 |
| 7,280,558 B1 * | 10/2007 | Grunkemeyer | ....... | G06F 9/4425 370/401 |
| 7,281,034 B1 * | 10/2007 | Eyal | ................. | H04N 21/26258 709/206 |
| 7,487,512 B2 * | 2/2009 | Brunswig | ............... | H04L 67/02 719/316 |
| 7,752,303 B2 * | 7/2010 | Peracha | .............. | G06F 11/3466 709/224 |
| 7,908,265 B2 * | 3/2011 | Abadi | ..................... | G06F 8/443 707/713 |
| 8,659,993 B2 * | 2/2014 | Lim | ........................ | H04L 69/40 370/216 |

(Continued)

OTHER PUBLICATIONS

U.S. Appl. No. 14/530,443, Suraj Puvvada, Tracking Asynchronous Entry Points for an Application, filed Oct. 31, 2014.

(Continued)

*Primary Examiner* — Alicia Baturay
(74) *Attorney, Agent, or Firm* — Parker Ibrahim & Berg LLC; James M. Behmke; Stephen D. LeBarron (57) ABSTRACT

A system monitors asynchronous transactions over a different number of threads by capturing data and tracking transitions in the particular framework. Once an asynchronous method is called, the transition framework may be tracked while executing a asynchronous method call. Within a .NET framework, monitoring may include tracking a task object return, continuation method calls at the completion of a method, and tracking the continuation method as it executes other code. The asynchronous method may then be correlated within a business transaction using the returned task object data.

22 Claims, 6 Drawing Sheets

(56) References Cited

U.S. PATENT DOCUMENTS

| | | | | |
|---|---|---|---|---|
| 8,935,395 B2* | 1/2015 | Bansal | H04L 43/50 | 709/200 |
| 8,938,533 B1* | 1/2015 | Bansal | H04L 43/022 | 709/200 |
| 9,015,278 B2* | 4/2015 | Bansal | H04L 43/50 | 709/200 |
| 9,015,315 B2* | 4/2015 | Bansal | H04L 43/50 | 709/200 |
| 9,015,316 B2* | 4/2015 | Bansal | H04L 43/50 | 709/200 |
| 9,015,317 B2* | 4/2015 | Bansal | H04L 43/022 | 709/200 |
| 9,037,707 B2* | 5/2015 | Bansal | H04L 43/022 | 709/200 |
| 9,077,610 B2* | 7/2015 | Bansal | H04L 43/022 | |
| 9,098,359 B2* | 8/2015 | Abbas | G06F 9/542 | |
| 9,167,028 B1* | 10/2015 | Bansal | H04L 43/50 | |
| 9,311,598 B1* | 4/2016 | Bansal | | |
| 9,369,356 B2* | 6/2016 | Bansal | H04L 43/022 | |
| 9,384,114 B2* | 7/2016 | Carmel | H04L 43/0817 | |
| 9,405,603 B2* | 8/2016 | Roth | G06F 9/547 | |
| 9,491,247 B2* | 11/2016 | Bansal | H04L 67/22 | |
| 9,594,662 B2* | 3/2017 | Mani | G06F 11/3466 | |
| 2002/0007482 A1* | 1/2002 | Cirne | G06F 9/4428 | 717/106 |
| 2006/0173878 A1* | 8/2006 | Bley | G06F 17/30548 | |
| 2007/0143323 A1* | 6/2007 | Vanrenen | G06F 9/5038 | |
| 2007/0143743 A1* | 6/2007 | Cobb | G06F 11/3447 | 717/127 |
| 2007/0169052 A1* | 7/2007 | Vanrenen | G06F 11/28 | 717/154 |
| 2007/0198699 A1* | 8/2007 | Peracha | G06F 11/3466 | 709/224 |
| 2009/0204969 A1* | 8/2009 | Abadi | G06F 9/466 | 718/101 |
| 2014/0068067 A1* | 3/2014 | Bansal | H04L 43/022 | 709/224 |
| 2014/0068068 A1* | 3/2014 | Bansal | H04L 43/022 | 709/224 |
| 2014/0068069 A1* | 3/2014 | Bansal | H04L 43/022 | 709/224 |
| 2015/0058092 A1* | 2/2015 | Rea | G06Q 10/0639 | 705/7.38 |
| 2015/0067146 A1* | 3/2015 | Raker | G06F 11/3495 | 709/224 |
| 2015/0106348 A1* | 4/2015 | Kapur | G06F 11/36 | 707/703 |
| 2015/0106659 A1* | 4/2015 | Kapur | G06F 11/3612 | 714/39 |
| 2015/0113122 A1* | 4/2015 | Sunkara | H04L 43/04 | 709/224 |
| 2015/0222503 A1* | 8/2015 | Bansal | H04L 43/022 | 709/224 |
| 2015/0227412 A1* | 8/2015 | Carmel | G06F 11/0793 | 714/2 |
| 2015/0281035 A1* | 10/2015 | Melikyan | H04L 67/42 | 709/224 |
| 2015/0288591 A1* | 10/2015 | Puvvada | H04L 43/10 | 370/242 |
| 2015/0319221 A1* | 11/2015 | Zmievski | H04L 67/10 | 709/202 |
| 2016/0124783 A1* | 5/2016 | Puvvada | G06F 9/547 | 719/330 |
| 2016/0124829 A1* | 5/2016 | Winslow | G06F 8/30 | 719/317 |
| 2016/0124832 A1* | 5/2016 | Kumar | G06F 11/3466 | 717/127 |
| 2016/0124833 A1* | 5/2016 | Gupta | G06F 11/3495 | 714/45 |
| 2016/0125060 A1* | 5/2016 | Pijewski | G06F 17/30377 | 707/615 |
| 2016/0224322 A1* | 8/2016 | Srinivasaiah | G06F 8/315 | |
| 2016/0224329 A1* | 8/2016 | Whitney | G06F 9/44505 | |
| 2016/0224400 A1* | 8/2016 | Shafique | G06F 11/079 | |
| 2016/0224990 A1* | 8/2016 | Shafique | H04L 67/22 | |
| 2016/0226719 A1* | 8/2016 | Ong | H04L 41/22 | |
| 2016/0321173 A1* | 11/2016 | Srinivasaiah | G06F 12/0261 | |
| 2016/0323160 A1* | 11/2016 | Melikyan | G06F 3/0604 | |
| 2016/0323362 A1* | 11/2016 | Srinivasaiah | H04L 41/046 | |

OTHER PUBLICATIONS

U.S. Appl. No. 14/701,418, Sanjay Nagaraj, Asynchronous Custom Exit Points, filed Apr. 30, 2015.

U.S. Appl. No. 14/530,564, Wiliam D. Pijewski, Asynchronous Processing Time Metrics, filed Oct. 31, 2014.

\* cited by examiner

AGENT ASYNCHRONOUS TRANSACTION MONITOR

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

A popular framework for providing a web is the .NET framework provided by Microsoft, Corp. In a .NET framework, certain transactions such as asynchronous transactions can be difficult to monitor. This is primarily due to the fact that a first thread may handle a first portion of a distributed business transaction, a second thread may handling another part of the distributed business transaction, and there is no connection or correlation between the two threads within the business transaction. What is needed is an improved manner for tracking asynchronous transactions.

SUMMARY OF THE CLAIMED INVENTION

The present technology may monitor asynchronous transactions over a different number of threads by capturing data and tracking transitions in the particular framework. Once an asynchronous method is called, the transition framework may be tracked while executing an asynchronous method call. Within a .NET framework, monitoring may include tracking a task object return, continuation method calls at the completion of a method, and tracking the continuation method as it executes other code. The asynchronous method may then be correlated within a business transaction using the returned task object data.

An embodiment may include a method for monitoring an asynchronous transaction. The method may detect an asynchronous method call within an application by an agent executing on a server. Asynchronous framework transitions may be tracked by the agent. The transitions may be initiated by the asynchronous method call. Asynchronous framework transition data may be correlated with a distributed business transaction performed at least in part on the server.

An embodiment may include a system for monitoring a business transaction. The system may include a processor, a memory and one or more modules stored in memory and executable by the processor. When executed, the one or more modules may detect an asynchronous method call within an application by an agent executing on a server, track asynchronous framework transitions by the agent, the transitions initiated by the asynchronous method call, correlate asynchronous framework transition data with a distributed business transaction performed at least in part on the server.

DETAILED DESCRIPTION

The present technology may monitor asynchronous transactions over a different number of threads by capturing data and tracking transitions in the particular framework. Once an asynchronous method is called, the transition framework may be tracked while executing an asynchronous method call. Within a .NET framework, monitoring may include tracking a task object return, continuation method calls at the completion of a method, and tracking the continuation method as it executes other code. The asynchronous method may then be correlated within a business transaction using the returned task object data.

A .NET framework may include one or more IIS web servers as well as additional servers. Each IIS server may include one or more applications and at least one additional server may include a coordinator. An application being monitored on an IIS server may include an agent and/or a profiler. The profiler may detect a call within or by the application and report the call to the coordinator. The coordinator may determine if the detected call is one that should be monitored, and informs the profiler appropriately. If the call should be monitored, and agent on the application monitors the call. In some instances, more or fewer modules than an agent and profiler may be used to monitor an application on a .NET framework. References to an agent and profiler are intended for purposes of example only.

One aspect of the present technology is that the asynchronous framework of the .NET application is monitored. In a .NET framework, an asynchronous method may be called as a task object. The method may be compiled in the .NET framework with a C# compiler. The .NET framework compiler may create a state machine and replace an await function with code that sets a continuation method. The present technology may instrument selected asynchronous methods, continuation constructor methods, task objects, and other framework aspects. When the task completes, the continuation method is called. Understanding the .NET framework and instrumenting it as it progresses allows the present technology to track asynchronous transactions that are performed within that framework.

Figure 1A:
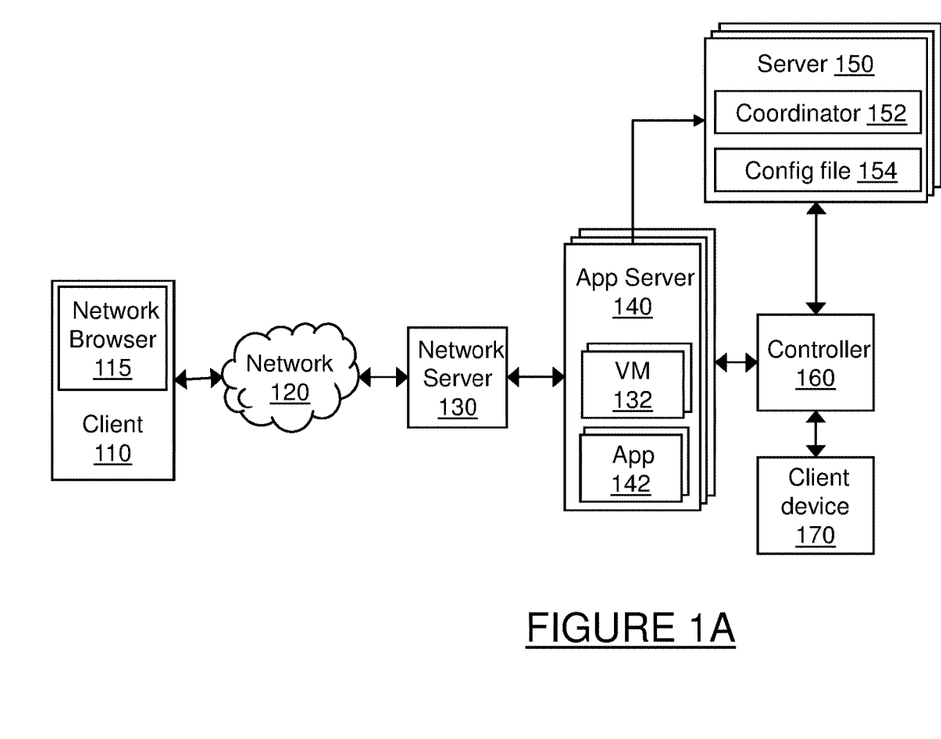
FIG. 1A is a block diagram of a system for monitoring an asynchronous transaction.

FIG. 1A is a block diagram of a system for monitoring an asynchronous transaction. FIG. 1A includes client 110, network 120, network server 130, application server 140, server 150, controller 160, and client device 170. Client 110 may communicate with network server 130 over network 120. Client 110 may be any sort of computing device, such as for example a desktop computer, a work station, a lap top computer a mobile device such as a smart phone or a tablet computer, or some other computing device. Client 110 may include network browser 115 as well as other software. Network browser 115 may be stored on client 110 and executed by one or more processors to provide content through an output device of client 110. The content may be received from application server 140 via network server 130 and network 120. Client 110 may receive input from a user through network browser 115 and communicate with application 140 server to provide content to the user.

Network 120 may facilitate communication of data between different servers, devices and machines. The network may be implemented as a private network, public network, intranet, the Internet, a Wi-Fi network, cellular network, or a combination of these networks.

Network server 130 is connected to network 120 and may receive and process requests received over network 120. Network server 130 may be implemented as one or more servers implementing a network service. When network 120 is the Internet, network server 130 may be implemented as a web server. Network server 130 and application server 140 may be implemented on separate or the same server or machine.

Application server 140 may include one or more applications 142. Application server 140 may be implemented using one or more servers which communicate with network server 130, server 150, controller 160, and other devices. In some embodiments, network server 130 and application server 140 may be implemented as the same server.

Figure 1B:
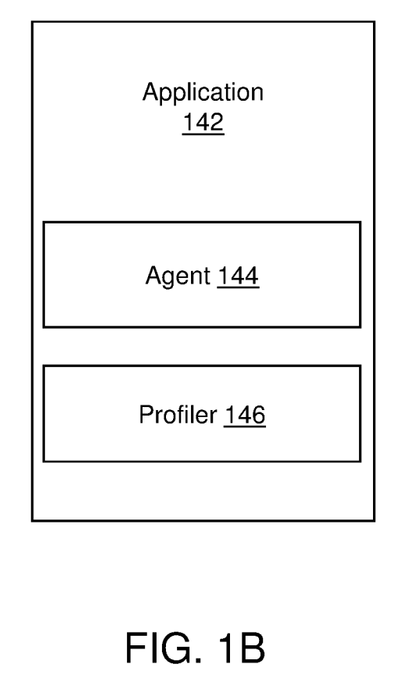
FIG. 1B is a block diagram of a node.

Application 142 may be monitored by one or more agents (see FIG. 1B). Application 142 may execute in any of a number of frameworks, such as for example a JAVA framework, a .NET framework, or other framework. Application 142 is discussed in more detail below with respect to the method of FIG. 1B.

Server 150 may communicate with application servers 140 and controller 160. Server 150 may include a coordinator 152 and a configuration file 154. Coordinator 152 may manage a list of methods, calls, objects and other code that should be monitored. Configuration file 154 may be accessed by coordinator 152 and may include a list of nodes that may be monitored within the system of FIG. 1A. The list of nodes may be compiled automatically, based on user input, or based on other parameters.

Controller 160 may control and manage monitoring of business transactions distributed over application servers 130-160. Controller 160 may receive runtime data from agents and coordinators, associate portions of business transaction data, communicate with agents to configure collection of runtime data, and provide performance data and reporting through an interface. The interface may be viewed as a web-based interface viewable by client device 110. In some embodiments, a client device 170 may directly communicate with controller 160 to view an interface for monitoring data.

In some instances, controller 160 may install an agent into one or more application servers 140. Controller 160 may receive correlation configuration data, such as an object, a method, or class identifier, from a user through client device 170.

FIG. 1B is a block diagram of an application. Application 142 of FIG. 1B includes agent 210 and profiler 220.

Agent 210 may be installed on an application server by byte code instrumentation, downloading the application to the server, or in some other manner. Agent 210 may be executed to monitor an application, application server, a virtual machine, or other logical machine and may communicate with byte instrumented code on an application server, virtual machine 132 or another application or program on an application server. Agent 210 may detect operations such as receiving calls, creating objects, and sending requests by an application server, virtual machine, or logical machine. Agent 210 may insert instrumentation and receive data from instrumented code, process the data and transmit the data to controller 160. Agent 210 may perform other operations related to monitoring an application or logical machine as discussed herein. For example, agent 210 may identify other applications, share business transaction data, aggregate detected runtime data, and other operations.

Profiler 220 may detect when an application makes a call and may take actions based on that detection. Profiler 220 may be implemented within or outside of application 142 on an application server. Profiler 220 may communicate with coordinator 152 to determine if the application making the call should be monitored. In some instances, profiler 220 may implement byte code to activate an agent or cause an agent to be activated in case that the application should be monitored based on information received from coordinator 152.

Figure 2:
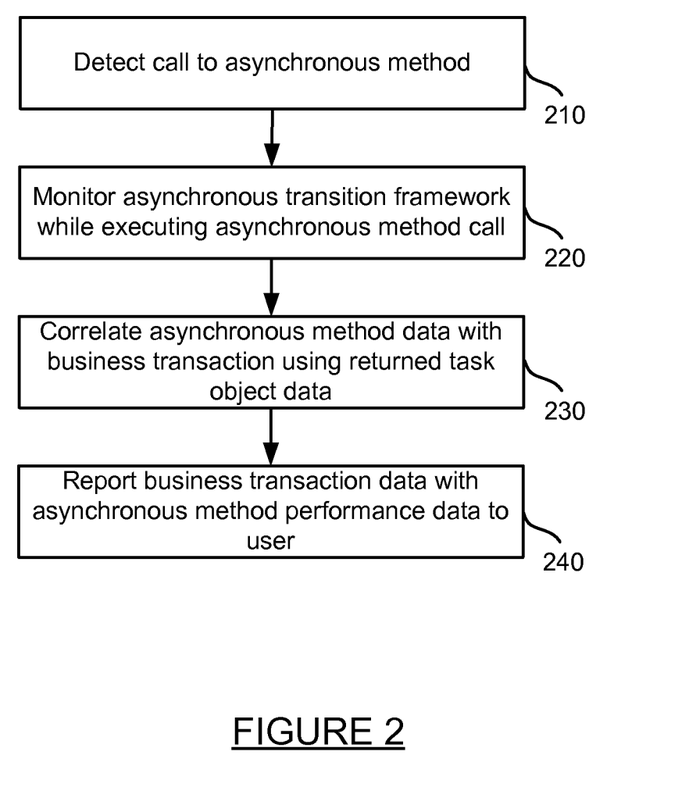
FIG. 2 illustrates a method for monitoring and asynchronous transaction.

FIG. 2 illustrates a method for monitoring an asynchronous transaction. A call to an asynchronous method is detected at step 210. The call may be detected by bits of code inserted into a .NET application using byte code instrumentation (BCI). The inserted instrumentation may detect calls to certain methods that are asynchronous in nature. Next, an asynchronous transaction framework is monitored while executing the asynchronous method call at step 220. Monitoring the asynchronous transaction framework may include detecting operations of the framework, such as executing the asynchronous method, instrumenting asynchronous methods, instrumenting a continuation method, and other monitoring operations. More details for monitoring and asynchronous transaction framework are discussed with respect to the method of FIG. 3.

The asynchronous method is correlated with business transactions using a return task object data at step 230. A first thread may be handling the asynchronous method call detected at step 210. A second method may handle a task object that is executed as part of the asynchronous method. Data obtained from monitoring the asynchronous method and task object may be used to correlate the threads together as part of a distributed business transaction. More details for correlating are discussed with respect to the method of FIG. 4. Data regarding the performance of the business transaction is reported at step 240. The data may include asynchronous method call information as part of the end to end business transaction. The data may be reported as part of a call graph, trending data, graphics, and other means.

Figure 3:
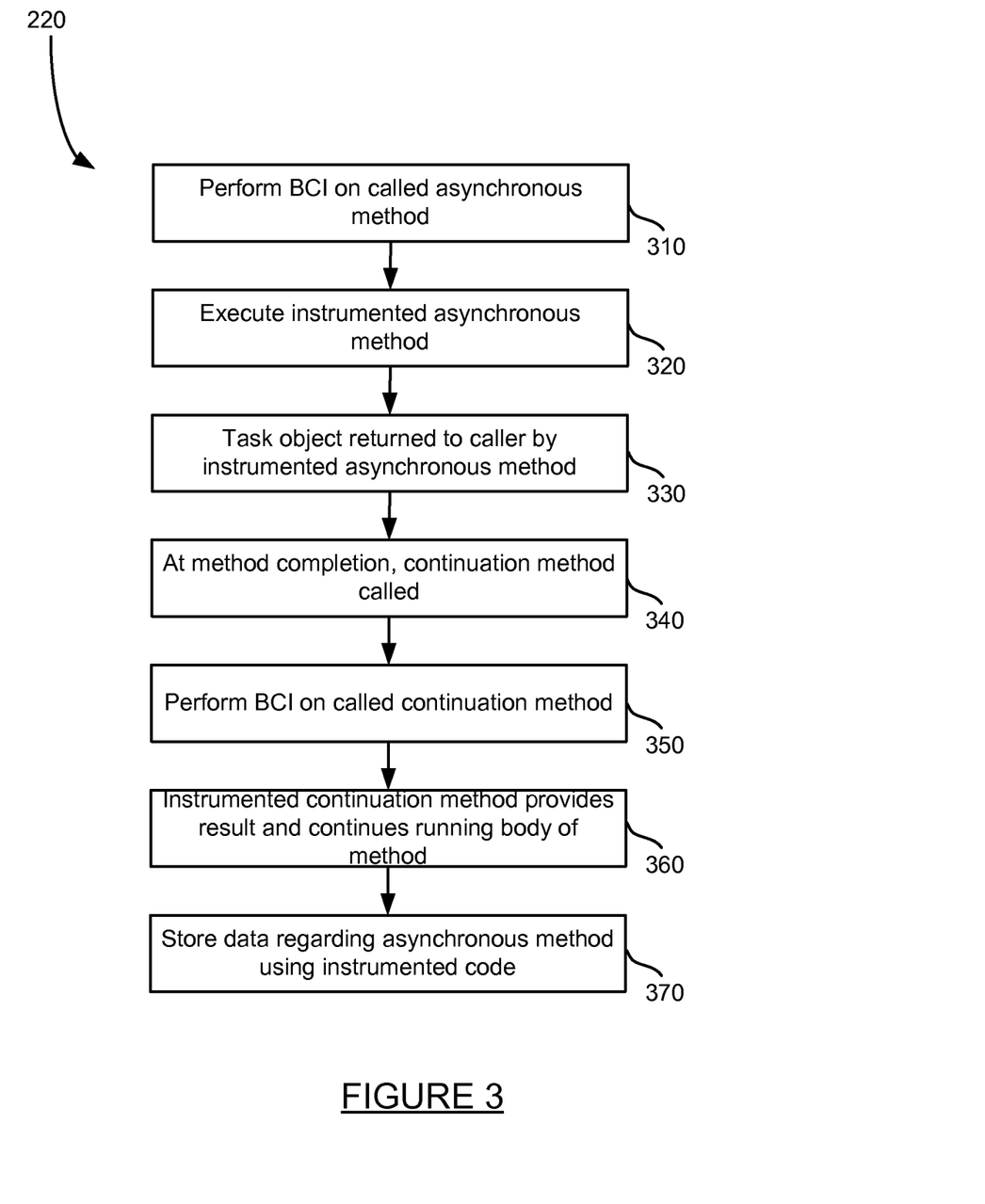
FIG. 3 illustrates a method for monitoring asynchronous transition framework.

FIG. 3 illustrates a method for monitoring an asynchronous transition framework. The method of FIG. 3 provides more detail for step 220 of the method of FIG. 2. First, BCI is performed on the called asynchronous method at step 310. The instrumentation may include creating a new method that encompasses the asynchronous method to be monitored within a wrapper. The wrapper may include code for monitoring the start and end of the called method, collecting data for the method, and other monitoring actions.

Next, the instrumented asynchronous method is executed at step 320. A task object is returned to the caller of the asynchronous method by the instrumented asynchronous method at step 330. The task object is created by the asynchronous method soon after the method is called. The task object created and returned by the instrumented asynchronous method is also into instrumented.

At the completion of the synchronous method, a continuation method is called at step 340. The continuation method is instrumented at step 350. Instrumentation for the continuation method may result in data such as the time the continuation method is called, the recipient of the continuation method call, and other data. The instrumented continuation method may also provide results of the task object and details regarding code in the body of the asynchronous method which is executed by the continuation method after the task is complete at step 360. Data regarding the asynchronous method is then stored using the instrumented code at step 370.

Figure 4:
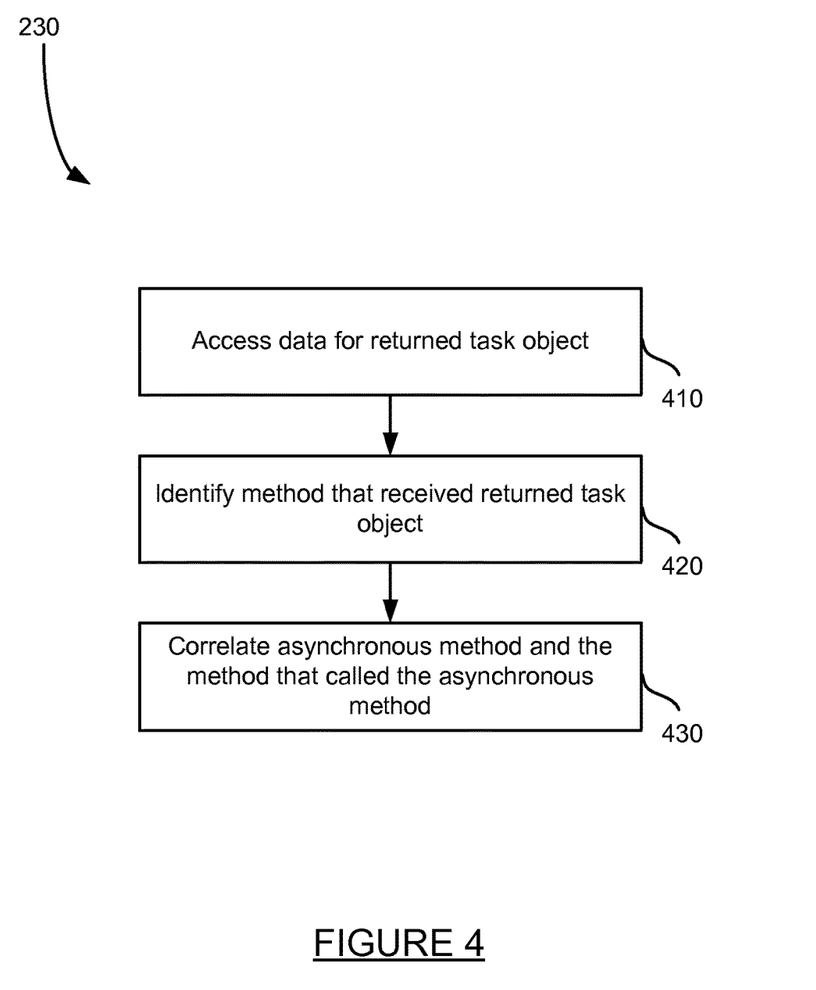
FIG. 4 illustrates a method for correlating asynchronous method data with business transaction.

FIG. 4 illustrates a method for correlating asynchronous method data with a business transaction. The method of FIG. 4 provides more detail for step 230 the method of FIG. 3.

First, data for the return task object is accessed at step 410. The method that received the return task object is then identified at step 420. The identification may be provided through instrumentation performed on the task object at task object creation.

The asynchronous method and the method that called the asynchronous method are then correlated at step 430. The correlation may be performed using the task object data. Once the asynchronous method and the method that called the asynchronous method are correlated within a business transaction, the end to end data for the business transaction may be combined for reporting. As such, when reporting details for the business transaction, details for the performance of each asynchronous part of the transaction may be provided.

Figure 5:
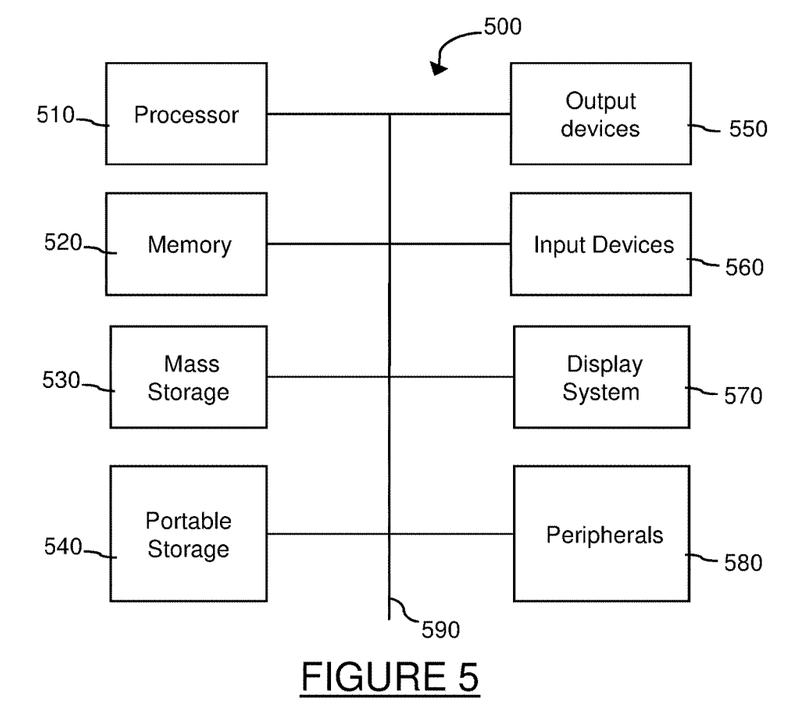
FIG. 5 is a block diagram of a computing system implementing the present technology

FIG. 5 is a block diagram of a computer system for implementing the present technology. System 500 of FIG. 5 may be implemented in the contexts of the likes of clients 110 and 170, network server 130, servers 140-150, and controller 160.

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android OS, and other suitable operating systems.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring an asynchronous transaction, comprising:
    detecting, by an agent executing on a server, an asynchronous method call within an application;
    determining whether to monitor the detected asynchronous method call;
    responsive to the determining, instrumenting the asynchronous method call to be monitored;
    responsive to the instrumenting, tracking, by the agent, asynchronous .NET framework transitions initiated by the instrumented asynchronous method call;
    obtaining asynchronous .NET framework transition data based on the tracking; and
    correlating the asynchronous .NET framework transition data with a distributed business transaction performed at least in part on the server.

2. The method of claim 1, wherein the instrumenting includes performing byte code instrumentation on the asynchronous method determined to be monitored.

3. The method of claim 1, wherein the asynchronous method determined to be monitored includes a continuation method.

4. The method of claim 1, wherein tracking includes collecting data associated with a returned task object sent in response to the asynchronous method call.

5. The method of claim 1, wherein correlating includes identifying a method that received returned task object.

6. The method of claim 1, wherein correlating includes correlating asynchronous method and the method that called the asynchronous method.

7. The method of claim 1, further comprising reporting performance of a distributed business transaction that includes a call to the asynchronous method.

8. The method of claim 1, wherein the instrumenting includes creating a new method that encompasses the asynchronous method to be monitored within a wrapper.

9. A non-transitory computer readable storage medium having embodied thereon a program, the program being executable by a processor to perform a method for monitoring an asynchronous transaction, the method comprising:
- detecting, by an agent executing on a server, an asynchronous method call within an application;
- determining whether to monitor the detected asynchronous method call;
- responsive to the determining, instrumenting the asynchronous method call to be monitored;
- responsive to the instrumenting, tracking, by the agent, asynchronous .NET framework transitions initiated by the instrumented asynchronous method call;
- obtaining asynchronous .NET framework transition data based on the tracking; and
- correlating the asynchronous .NET framework transition data with a distributed business transaction performed at least in part on the server.

10. The non-transitory computer readable storage medium of claim 9, wherein the instrumenting includes performing byte code instrumentation on the asynchronous method determined to be monitored.

11. The non-transitory computer readable storage medium of claim 9, wherein the asynchronous method determined to be monitored includes a continuation method.

12. The non-transitory computer readable storage medium of claim 9, wherein tracking includes collecting data associated with a returned task object sent in response to the asynchronous method call.

13. The non-transitory computer readable storage medium of claim 9, wherein correlating includes identifying a method that received returned task object.

14. The non-transitory computer readable storage medium of claim 9, wherein correlating includes correlating asynchronous method and the method that called the asynchronous method.

15. The non-transitory computer readable storage medium of claim 9, the method further comprising reporting performance of a distributed business transaction that includes a call to the asynchronous method.

16. A system for monitoring a business transaction, comprising:
- a processor;
- a memory; and
- one or more modules stored in memory and executable by a processor to perform operations including:
  - detect, by an agent executing on a server, an asynchronous method call within an application;
  - determine whether to monitor the detected asynchronous method call;
  - responsive to the determining, instrument the asynchronous method call to be monitored;
  - responsive to the instrumenting, track, by the agent, asynchronous .NET framework transitions initiated by the instrumented asynchronous method call;
  - obtain asynchronous .NET framework transition data based on the tracking;
- and correlate the asynchronous .NET framework transition data with a distributed business transaction performed at least in part on the server.

17. The system of claim 16, wherein the one or more modules are configured to perform byte code instrumentation on the asynchronous method determined to be monitored.

18. The system of claim 16, wherein the asynchronous method determined to be monitored includes a continuation method.

19. The system of claim 16, wherein tracking includes collecting data associated with a returned task object sent in response to the asynchronous method call.

20. The system of claim 16, wherein the one or more modules are configured to correlate including identify a method that received returned task object.

21. The system of claim 16, wherein the one or more modules are configured to correlate including correlate asynchronous method and the method that called the asynchronous method.

22. The system of claim 16, the one or more modules executable to report performance of a distributed business transaction that includes a call to the asynchronous method.

* * * * *